(12) United States Patent
Salin

(10) Patent No.: US 11,076,701 B2
(45) Date of Patent: Aug. 3, 2021

(54) CONVERTIBLE MULTIFUNCTIONAL FURNITURE

(71) Applicant: Roberto Salin, Bolzano (IT)

(72) Inventor: Roberto Salin, Bolzano (IT)

( * ) Notice: Subject to any disclaimer, the term of this patent is extended or adjusted under 35 U.S.C. 154(b) by 337 days.

(21) Appl. No.: 16/082,556

(22) PCT Filed: Mar. 15, 2017

(86) PCT No.: PCT/EP2017/056061
§ 371 (c)(1),
(2) Date: Sep. 6, 2018

(87) PCT Pub. No.: WO2017/157981
PCT Pub. Date: Sep. 21, 2017

(65) Prior Publication Data
US 2019/0075929 A1    Mar. 14, 2019

(30) Foreign Application Priority Data
Mar. 16, 2016   (IT) .......................... UA2016A001720

(51) Int. Cl.
*A47C 17/13*     (2006.01)
*A47C 17/175*    (2006.01)
(Continued)

(52) U.S. Cl.
CPC ........ *A47C 17/138* (2013.01); *A47C 17/1756* (2013.01); *A47C 19/045* (2013.01); *F16H 55/26* (2013.01)

(58) Field of Classification Search
CPC ........ B66F 11/00; B66F 11/042; B66F 7/065; B66F 3/22; A47C 17/138; A47C 17/134; A47C 19/045; F16H 55/26
See application file for complete search history.

(56) References Cited

U.S. PATENT DOCUMENTS

| 346,246 A | * | 7/1886 | Uhde | ..................... | A61G 7/012 5/611 |
| 4,768,242 A | * | 9/1988 | LoTurco | .............. | A47C 19/045 5/100 |

(Continued)

FOREIGN PATENT DOCUMENTS

| DE | 846 157 C | 8/1952 |
| DE | 198 42 908 C1 | 1/2000 |
| WO | 2014/147003 A1 | 9/2014 |

OTHER PUBLICATIONS

International Search Report, dated Jun. 16, 2017 (2 pages).

*Primary Examiner* — David R Hare
*Assistant Examiner* — Adam C Ortiz
(74) *Attorney, Agent, or Firm* — Jacobson Holman PLLC

(57) ABSTRACT

Convertible multifunctional furniture comprising at least one support base, at least one lifting device which is supported on the support base, a usage unit, a horizontal rotational axis in the longitudinal or transverse direction about which the usage unit can be rotated, and a mounting pin at each end of the rotational axis. At least one scissor mechanism is arranged between the lifting devices and each mounting pin of the rotational axis, at least one scissor limb is connected to a drive of the lifting device at one end and to a support at the other end. The other end of the scissor both is connected to a linear element for controlling purposes, said linear element having a surface which can be coupled to a surface of a wheel that is rotatably coupled to a complementary element of the mounting pin.

16 Claims, 22 Drawing Sheets

(51) Int. Cl.
*A47C 19/04* (2006.01)
*F16H 55/26* (2006.01)

(56) References Cited

U.S. PATENT DOCUMENTS

| | | | | |
|---|---|---|---|---|
| 5,613,255 A * | 3/1997 | Bish | ............ | A61G 7/005 |
| | | | | 5/610 |
| 5,725,205 A * | 3/1998 | O'Berg | ............ | B25H 1/00 |
| | | | | 269/37 |
| 5,732,425 A * | 3/1998 | Leung | ............ | A61G 13/06 |
| | | | | 108/145 |
| 7,146,662 B1 * | 12/2006 | Pollard | ............ | A47B 91/16 |
| | | | | 5/617 |
| 8,015,638 B2 * | 9/2011 | Shimada | ............ | A47C 19/045 |
| | | | | 5/611 |
| 2010/0064438 A1 * | 3/2010 | Knudsen | ............ | B66F 3/22 |
| | | | | 5/611 |

* cited by examiner

CONVERTIBLE MULTIFUNCTIONAL FURNITURE

BACKGROUND OF THE INVENTION

The present invention relates to a multipurpose convertible furniture item.

PCT/EP2014/A000036, ITBZ2014/A000036, and PCT/EP2015/071017 discloses systems for converting furniture items from one position of use to at least one further position of use. These positions of use include, for example, lying, seating, treatments such as massages, bed, armchair, bed making, etc. In this respect, furniture items are equipped with units of use that may have two opposite faces with equal or different purposes, to reach the aforementioned positions.

SUMMARY OF THE INVENTION

The object of the present invention is to provide further improvements to the kinematic system for moving the unit of use to its desired positions, while possibly further reducing costs and facilitating use by the user.

This object is fulfilled by a multipurpose convertible furniture item.

Therefore, a multipurpose convertible furniture item is provided, which has a scissors mechanism located between the lifting device and its respective pivot pin. At least one branch of the scissors is connected at one end with an actuator of the lifting device and at the other end with the beam thereof. The other branch is controllingly connected with a meshing toothed element, which is guided into a gear wheel adapted to be rotatably coupled to a complementary element of the pivot pin.

In a first embodiment the toothed element is a sliding rack with a non-toothed section, which is placed within a guide that is rigidly joined to the beam that connects the two upper ends of the scissors branches to control a kinetic arrangement. At the end of the non-toothed section of the rack, the teeth start to intersect the gear wheel which thereby rotates through 180°.

In one variant, the kinematic arrangement is composed of a disk keyway formed on the pivot pin of the unit of use. This disk keyway may be coupled with the key of a disk that is rotatably supported by the beam with its axis joined to the axis of the gear wheel whose idle wheel meshes with the rack.

In another variant, the kinematic arrangement is composed of a gear wheel that is rigidly joined to the pin and is adapted to be coupled with a gear wheel that is rotatably supported the beam with its axis joined to the axis of the gear wheel whose idle wheel meshes with the rack.

In a further variant the kinematic arrangement is composed of a bar linkage with bars converging into a joint. One end of one of the bars has a toothed circular sector rigidly joined thereto, which is adapted to mesh with a gear wheel from an angle formed between the two bars, to rotate the unit of use through a given angle, e.g. 180°, preferably with the interposition of multiplying gears. One of the gears has an idle wheel.

In a further embodiment, the unit of use is an armchair-chair or a bed, that is designed to be converted by the mechanism of the invention to an armchair-bed, such that a 180° rotation of the unit of use provides a massage table, and folding of the unit of use provides a chair, whose backrest and seating surface are formed by he massage table.

The lifting device may consist, for example, of at least one pantograph (for armchairs, sofas, beds, high chairs for children etc.), with a beam placed thereon for supporting a sliding rack engaging with the pin of one element of the pantograph. As the pantograph is raised, the rack slides along the beam to reach a gear wheel and moves on until it reaches the pivot pin that projects, for example, out of the mattress or massage table of the unit of use. Once the mattress or the mattress with the massage table has reached a height suitable for rotation, the gear wheel with its one-way idle wheel rotates the mattress with the massage table through 180° due to the forward movement of the rack.

Once rotation is completed, the pantograph is lowered to its initial position and the pin of the mattress is separated from the gear wheel and is ready for a new rotation. In addition to the gear wheel with the key, the idle wheel, a lead-in funnel for facilitating introduction of the pin with the disk keyway of the mattress, the beam also has at least two folding wings or rollers parallel to the beam which are controlled by an electromagnet or in a manner known in the art to reach a position perpendicular to the beam such that, as the pantograph is raised, they intersect the frame-table-base-support, mattress, armchair, bed etc, at its bottom, thereby lifting it horizontally if at least four frontally opposed ones are actuated, with two pantographs, or tilting it in either direction, if at least two, diametrically opposed ones are actuated.

This system may be also suitable for ern chairs, sofas, chairs, desks, furniture. In this case, the supporting feet are omitted.

The axis of rotation may be also situated on the horizontal axis, transverse to the sides of the armchair-bed, gym table, massage table, patient transferring table, chair; armrests and push handles, not shown, may be also added both to a bed and to an armchair-chair. The sliding/lifting/tilting/supporting mechanisms of the armchair-bed may include telescopic cylinders, guides or scissors mechanisms possibly also located on the transverse side. Namely, the armchair-bed has at least two lifting mechanisms.

The beam, with its wings or rollers, which are designed to intercept the frame-base-table-support both lifts and tilts the latter and acts as a support for the bed which no longer needs feet. This system may be also suitable for armchairs, sofas, chairs, desks, furniture. In this case, the supporting feet are omitted. The bearing feet are integrally formed with the ground-supported underframe containing the scissors mechanisms and at least one motor or the telescopic guides, the telescopic cylinders and the bars. The scissors (pantograph) may be also useful to lift, lower or tilt sofas, armchairs, furniture, tables, high chairs for children, always having at least two lifting mechanisms, in the longitudinal or transverse axis of the multipurpose convertible furniture tem or bearing surfaces.

BRIEF DESCRIPTION OF THE DRAWINGS

Further characteristics and advantages will be apparent from the claims and from the following description of a few embodiments as shown in the accompanying drawings, in which

FIGS. 1 to 4 show a schematic general view of a multipurpose convertible furniture item according to the invention, designated by numeral 1.

DETAILED DESCRIPTION OF THE INVENTION

Figure 1:
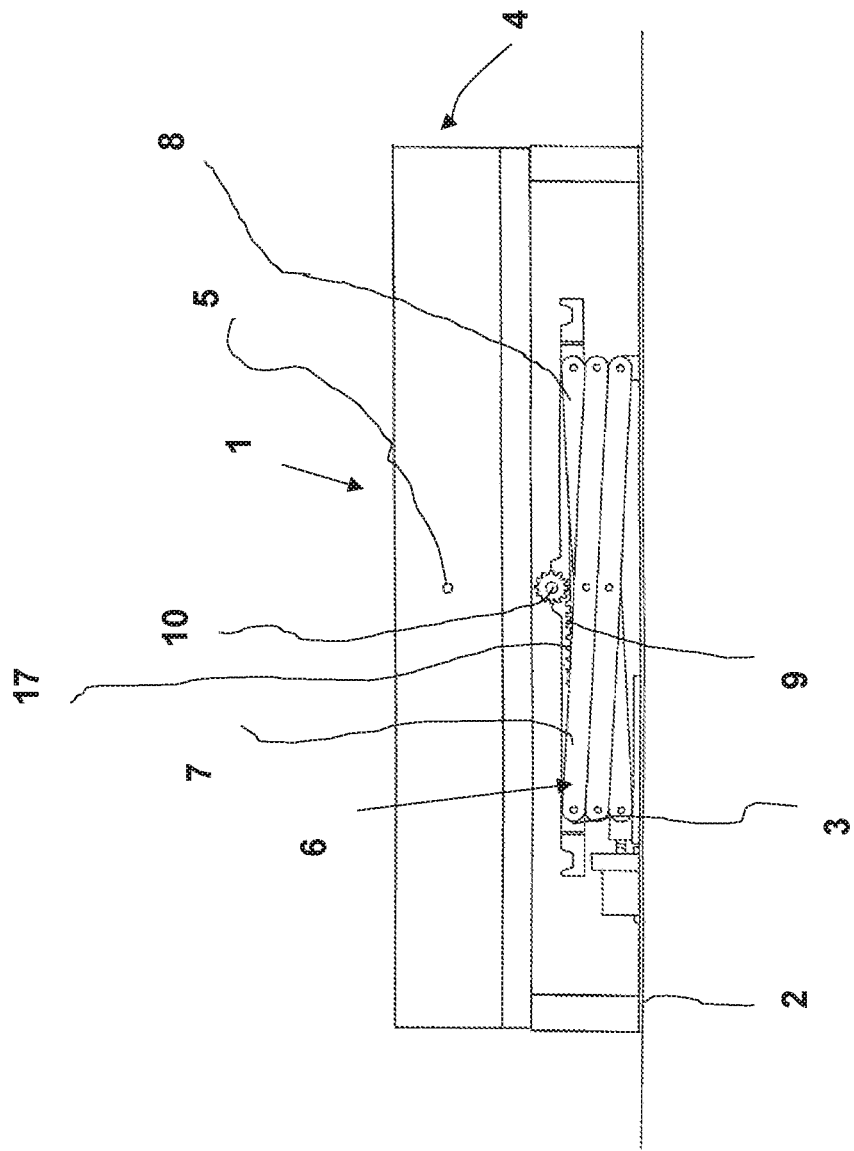
FIG. 1 shows a schematic front view of a multipurpose convertible furniture item in a rest position.
Figure 2:
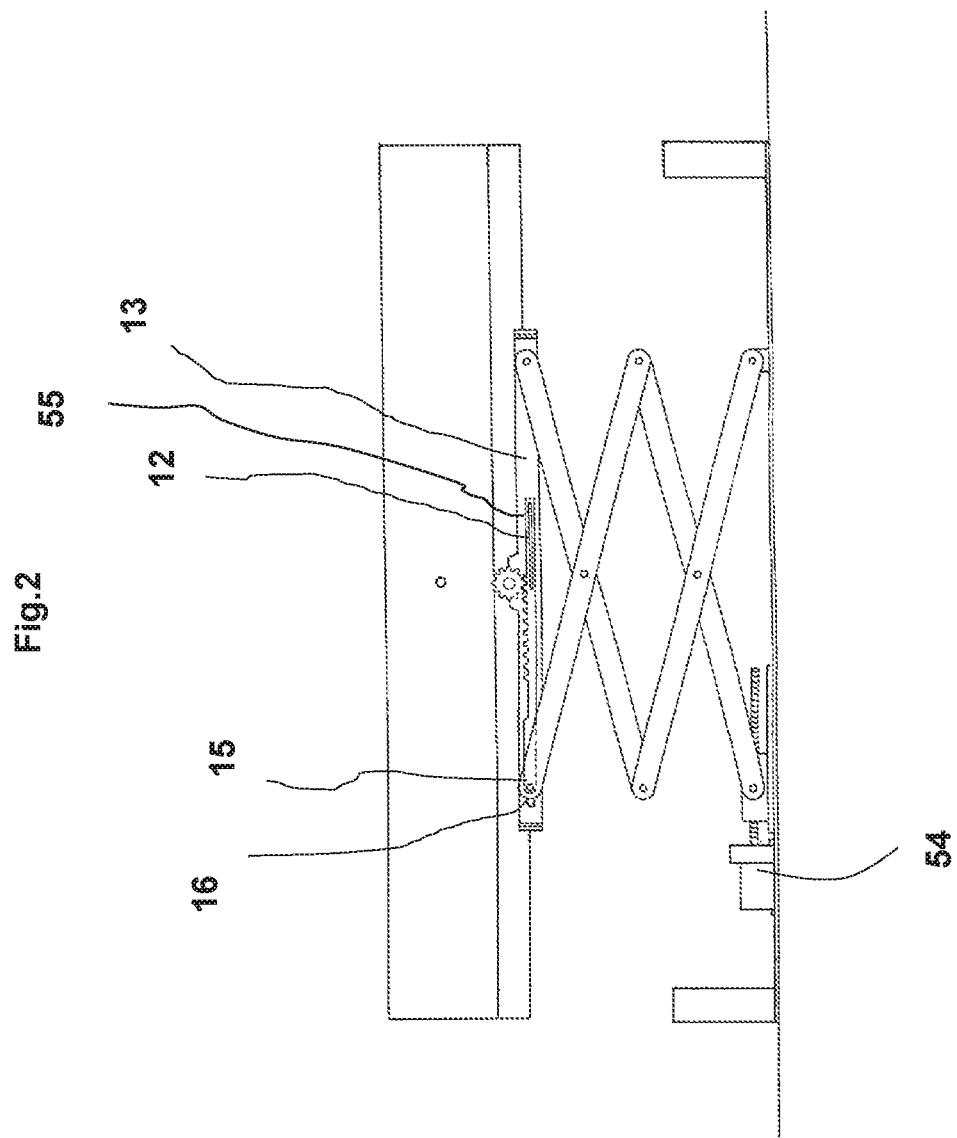
FIG. 2 shows a schematic front view of a multipurpose convertible furniture item in a lifted position.
Figure 3:
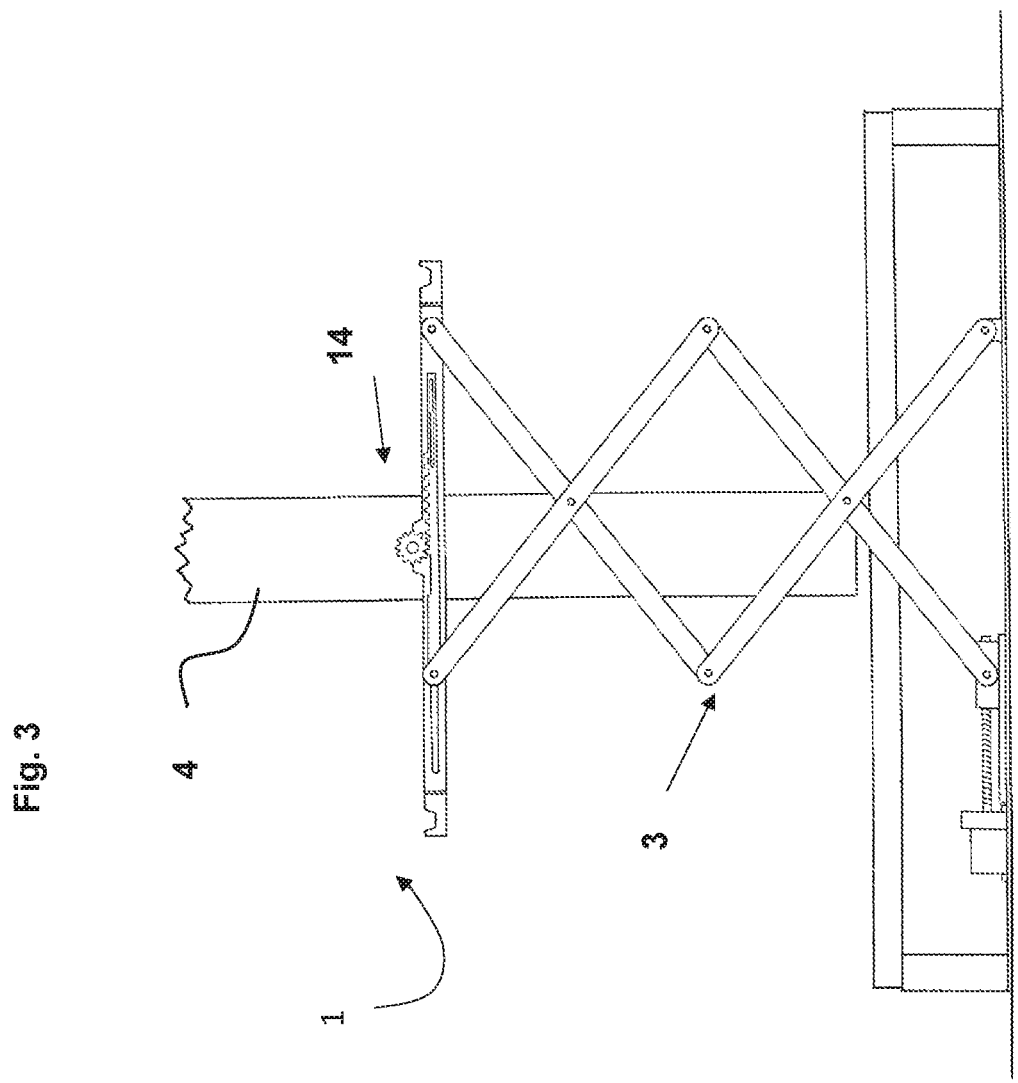
FIG. 3 shows a schematic front view of a multipurpose avertible furniture item in a 90°-rotated position of the unit of use.
Figure 4:
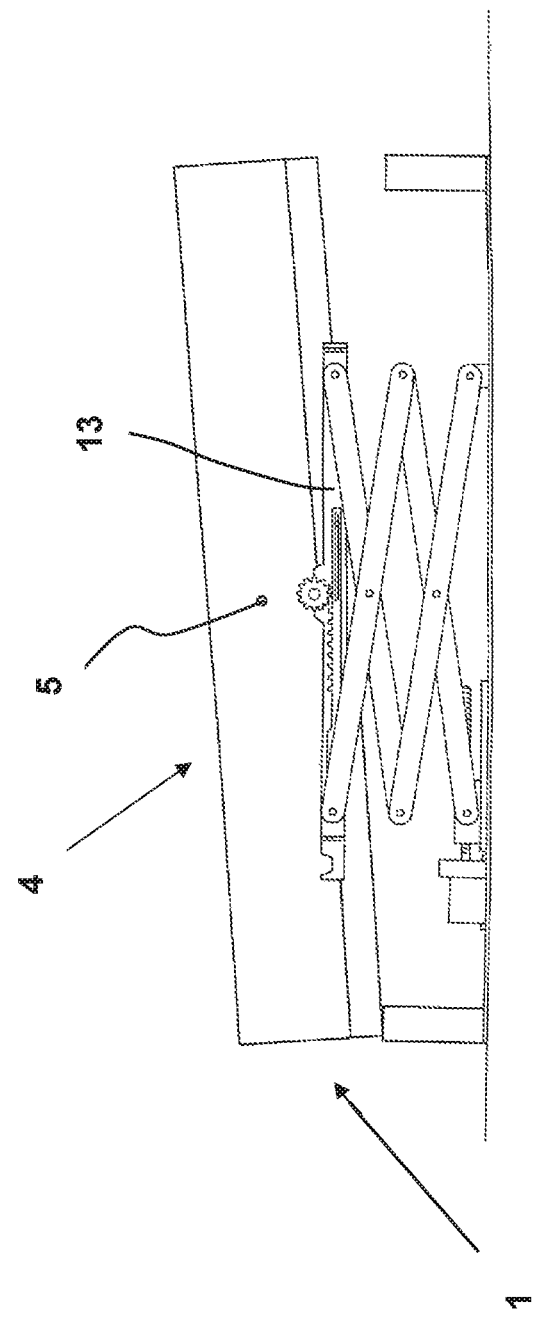
FIG. 4 shows a schematic front view or a multipurpose convertible furniture item in a tilted position of the unit of use, partially disengaged from the bearing frame.

The furniture item 1 comprises a support base 2, a lifting device supported on the base 2 and a unit of use 4 that has two outer bearing faces and is carried by the lifting device 3.

The unit of use 4 may be rotated about an axis of rotation which may extend either in the longitudinal direction or in a direction transverse to the faces of the unit of use 4.

The unit of use 4 is equipped with a bearing pivot pin 5 at each end of the axis of rotation and is adapted to be connected with the lifting device 3.

A scissors mechanism 6 is placed between the lifting device and its respective pivot pin 5, with at least one branch 7 of the scissors connected at one end with an actuator 54 of the lifting device and at the other end with the beam 13.

The other end of the branch 7 of the scissors is controllingly connected with a toothed element in the form of a meshing rack 9, which is guided into a gear wheel 10 adapted to be rotatably coupled to a complementary element 11 of the pivot pin 5.

In one embodiment, the mechanism 14 consists of the rack 9 carried by a block or pin 55 within a guide 12 that is rigidly joined to a beam 13 which connects the two ends of the scissors branches 7 and 8 for controlling the kinematic arrangement 14, with at least one of the ends of the scissors branch 7 hinged thereto by means of a pivot pin 15 that slides within a groove 16 parallel to the rack, the latter having a toothed section 17 adapted to engage with the gear wheel 10 starting from a distance between the two branch ends. The gear wheel 10 is rotatably placed on the beam 13 in a central position thereof, with its axis transverse to the longitudinal extent of the guide 12 and is adapted to be connected by means of the kinematic arrangement 14 with the pin 5 of the unit of use 4.

Figure 5:
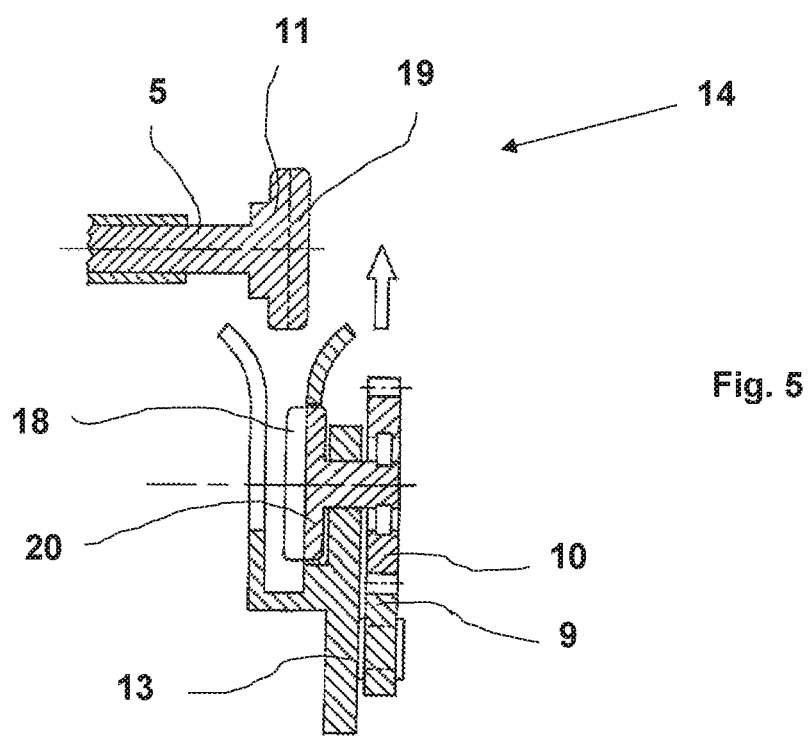
FIG. 5 shows a schematic vertical section of a kinematic rotating arrangement according to a first embodiment.

In a further embodiment, as shown in FIG. 5, the kinematic arrangement 14 is composed of a disk keyway 19 on the pin 5, which is adapted to be coupled with the key 18 of a disk 20 that is rotatably supported by the beam 13 with its axis joined to the axis of the gear wheel 10 with an idle wheel meshing with the rack 9.

Figure 8:
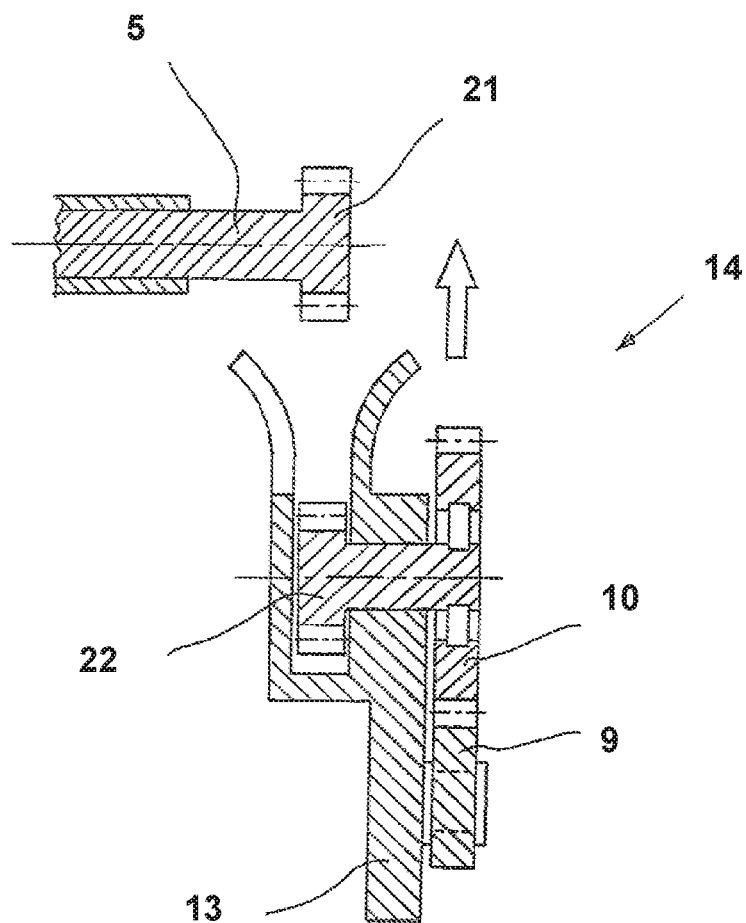
FIG. 8 shows a vertical section according to a third embodiment.
Figure 9:
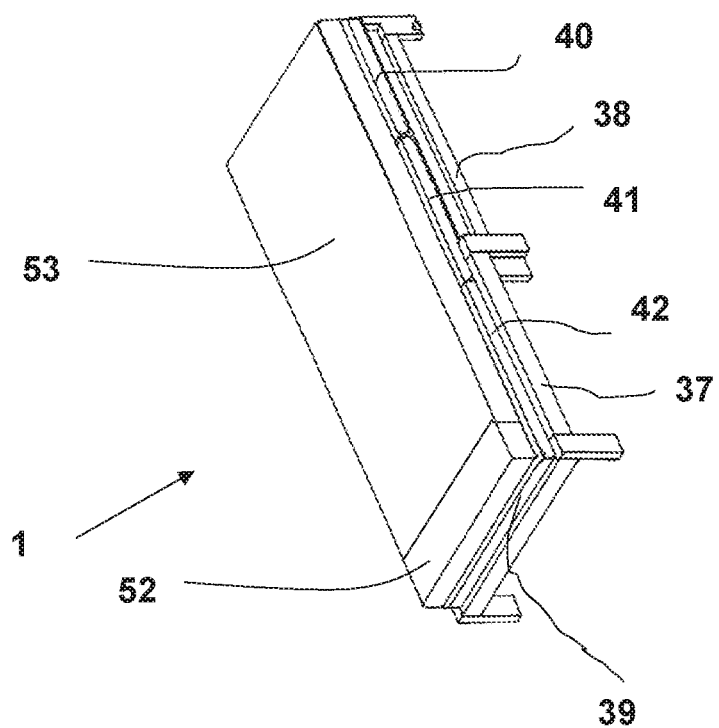
FIG. 9 shows a schematic perspective view of a modular framework of a convertible bed.
Figure 10:
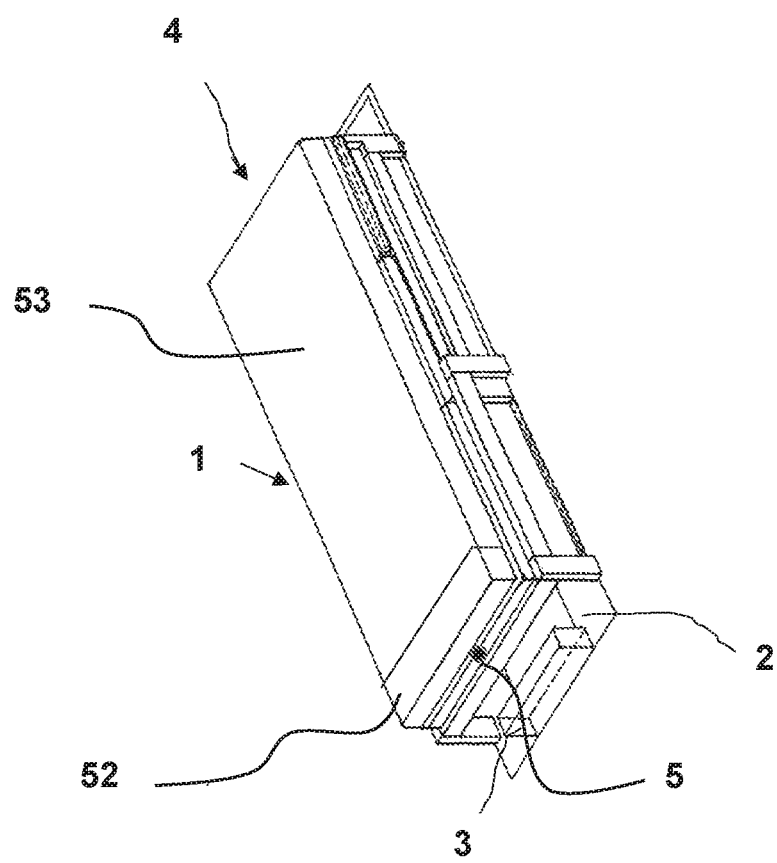
FIG. 10 shows a perspective view of FIG. 9, in which the container-lifting-rotating-tilting mechanism is depicted.
Figure 11:
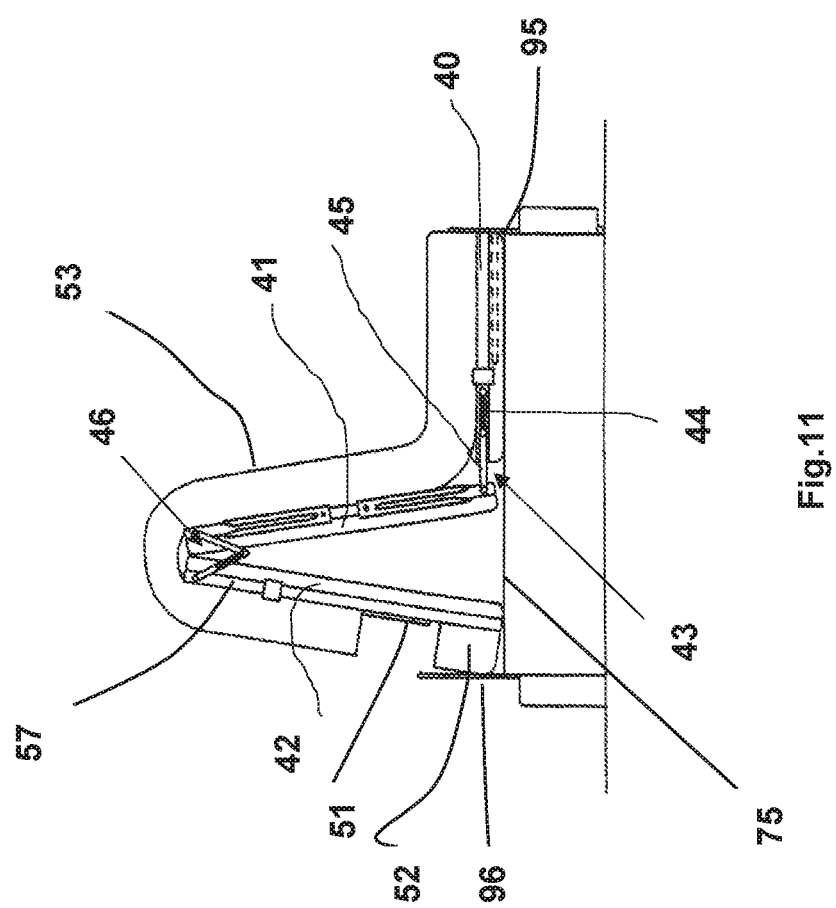
FIG. 11 shows a schematic side view of a convertible armchair, with a mattress striding guide composed of first and second sections.
Figure 12:
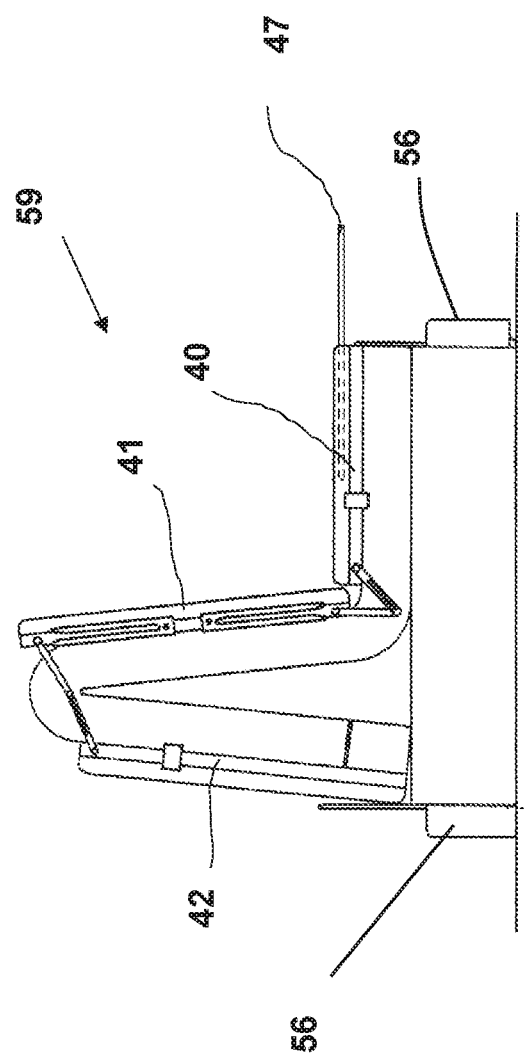
FIG. 12 shows a schematic side view of a convertible chair with a pulled-out plate.
Figure 13:
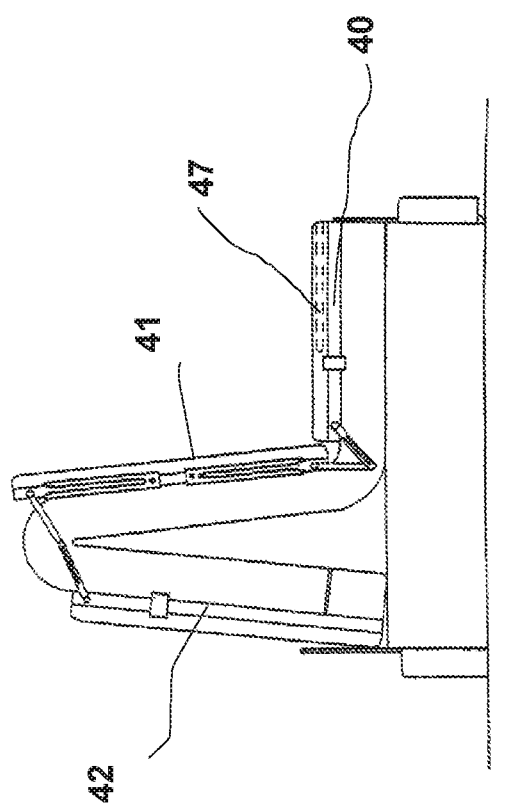
FIG. 13 shows a schematic side view of a convertible chair with a retracted plate.
Figure 14:
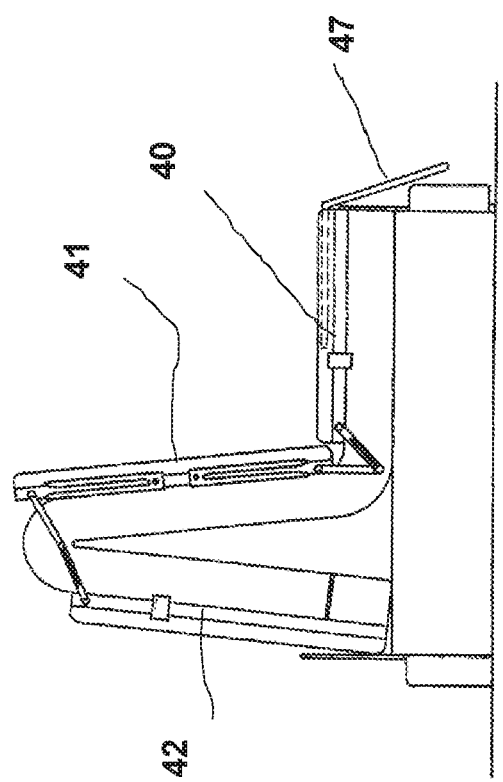
FIG. 14 shows a schematic side view of a convertible Chair with a folded plate.
Figure 15:
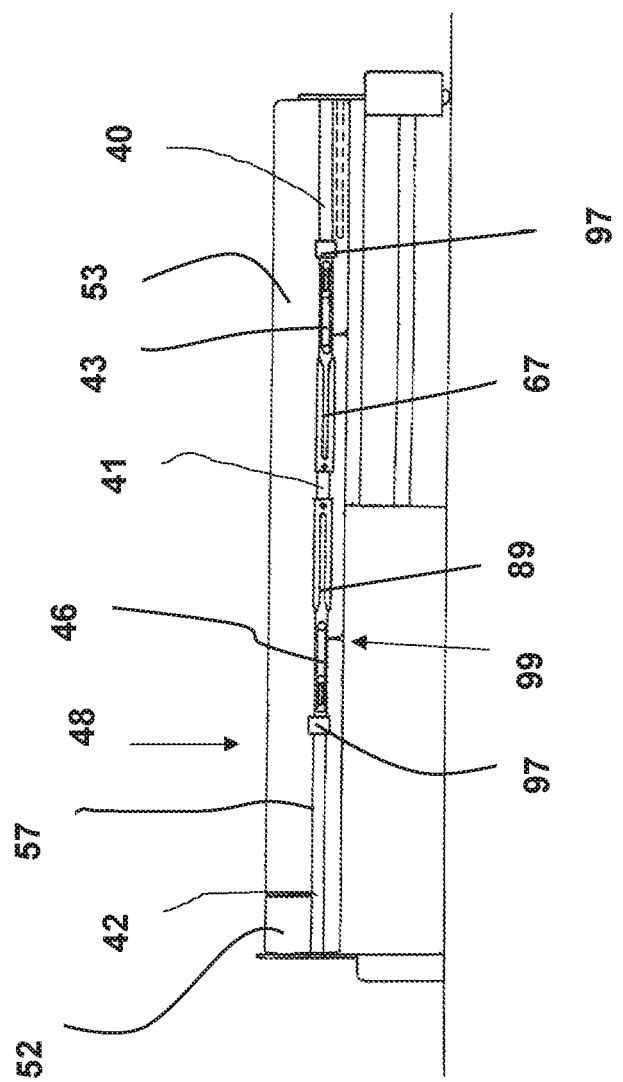
FIG. 15 shows a side view of a convertible bed.

In yet another embodiment as shown in FIG. 8, the kinematic arrangement 14 is composed of a pinion 21 rigidly joined to the pin 5 and adapted to be coupled with a gear wheel 22 that is rotatably supported by the beam 13 with its axis joined to the axis of the gear wheel whose idle wheel 10 meshes with the rack 9.

Figure 6:
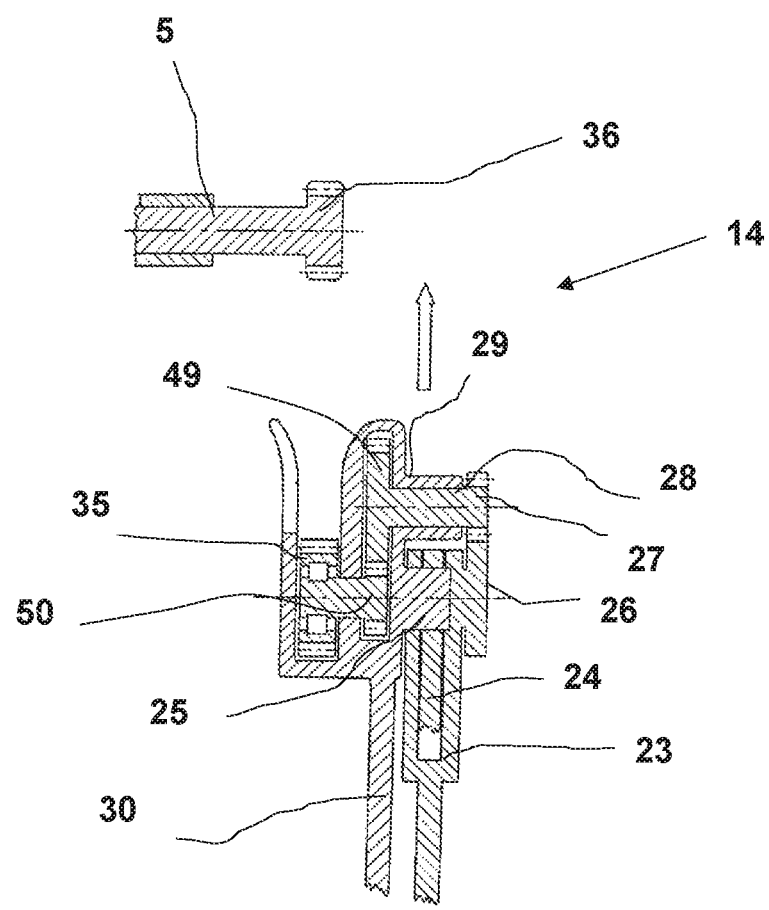
FIG. 6 shows a schematic vertical section of a kinematic rotating arrangement according to a second embodiment.
Figure 7:
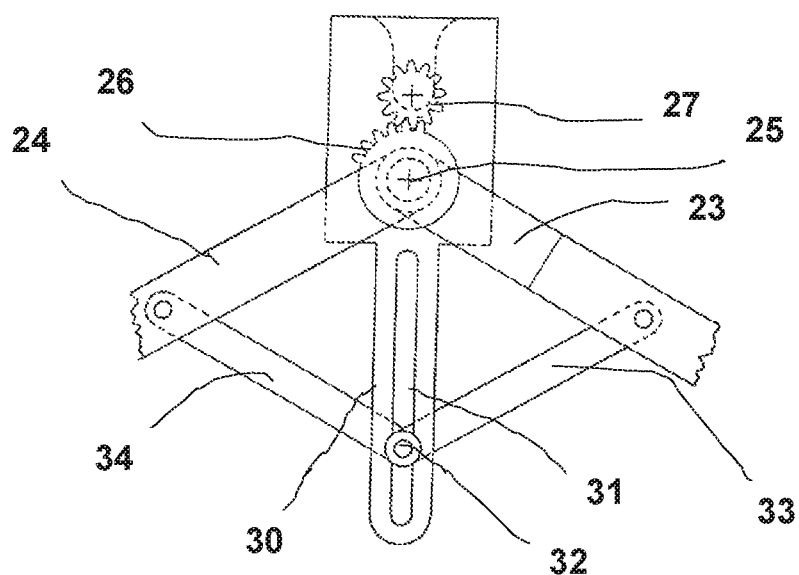
FIG. 7 shows a schematic front view of a kinematic rotating arrangement according to a different embodiment of FIG. 6.

In another embodiment, as shown in FIGS. 6 and 7 the kinematic arrangement 14 is composed of a bar linkage with bars 23 and 24 converging into a joint 25 and a toothed circular sector 26 rigidly joined to the end of the bar 23 and meshing with a pinion 27 on a shaft 28 that is rotatably carried by a flange 29 having an extension 30 with a bisecting line 31. A joint 32 of one of the ends of two arms 33 and 34 slides in a bisecting guide 31 and the other ends are hinged to the respective bars 23 and 24 at a distance from their joint 25. The pinion 27 transfers the rotary motion through the multiplying gears 49, 50 to the pinion 35 adapted to engage with a gear 36 carried by the pin 5 of the unit of use. One of gear wheels has an idle wheel.

In one exemplary embodiment of the convertible furniture item 1 of the invention, the unit of use 4 consists of two frameworks 37 and 38 that can be fitted into and pulled out of each other, the former being a massage table 39 composed of three mutually articulated sections 40, 41 and 42, one 40 of which cooperates with part of the second section 53 of the mattress is connected with a second section 41 via a first toggle joint lever 43, cooperating with part of the second section 53 of the mattress, one end of a first lever 44 whereof being articulated to the first section 40 end the end of the second lever 45 being articulated to the second section 41, whose other end is articulated to the third section 42 via a second toggle joint lever 46 whose ends are hinged to the second and third sections 41, 42, cooperating with the first section 52 and the second section 53 of the mattress.

Figure 16:
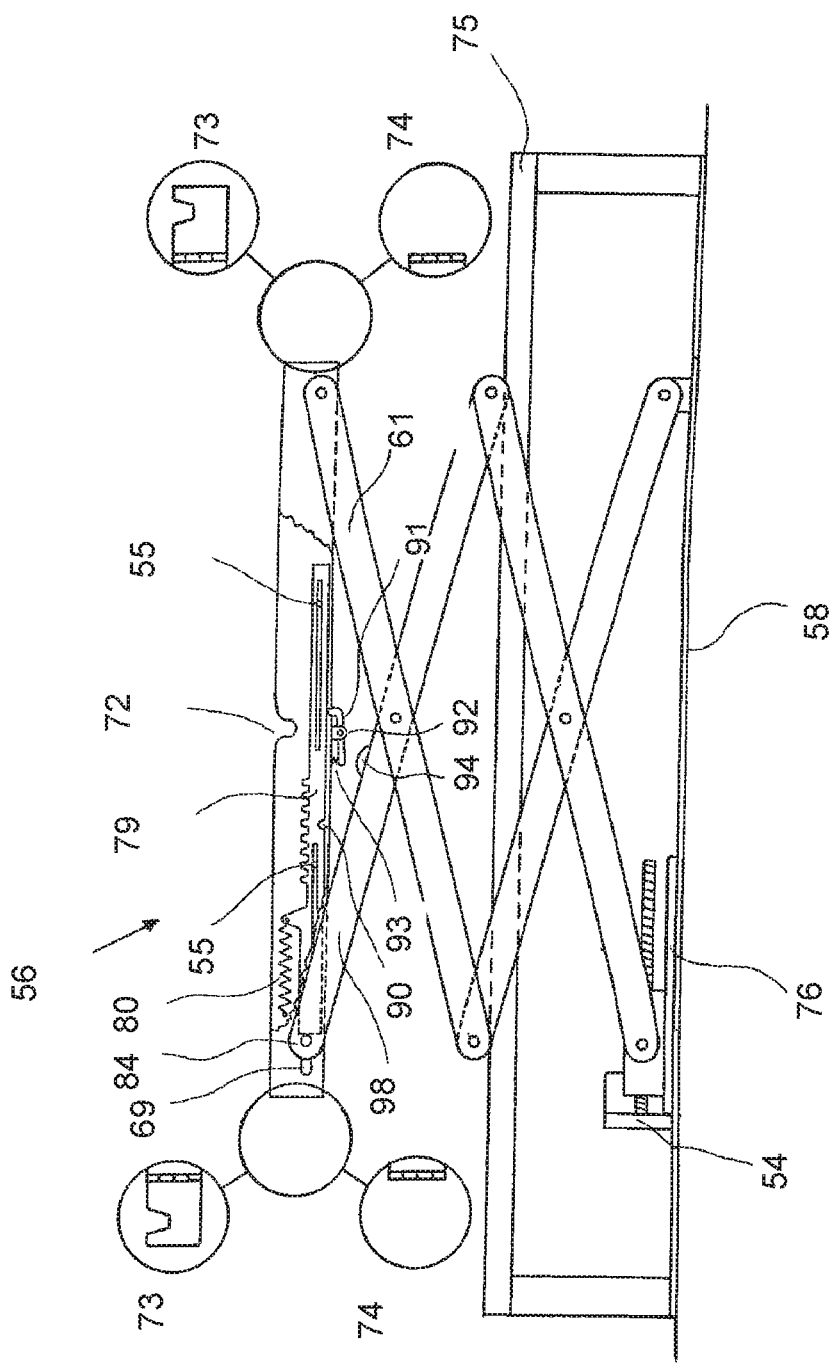
FIG. 16 shows a schematic front view of a lifting mechanism for a multipurpose convertible furniture item in a lifted position, according to a second embodiment.

FIG. 16 shows a further embodiment of a lifting device 56. It comprises a bearing base 58 with an actuator 54 rigidly joined thereto. The latter actuates the device 56, as is known in the art, by means of a slider that slides along a linear guide 76. Here, one of the branches 61 is hinged to the free end of the beam 60, and the free end of the branch 98 is hinged around a pin 84 that slides in a groove 69 formed in the beam 60 to push the rack 79 toward the free end of the branch 61 as the lifting device is being raised. For this purpose the rack 79 has two grooves 85 end 86 in which pins or blocks 65 are engaged to ensure displacement of the horizontal rack. The spring 80 is loaded by the displacement of the rack 79 which is pushed by the pin 84 as the lifting device is raised. Conveniently, the beam 60 has a support 92 fixed thereto, for supporting a pivoting lever 91, one pin-shaped end whereof engages in a corresponding receptacle 90 formed in the rack 79. The other end of the ever is elastically loaded by a spring 93 to snap into this receptacle. An automatic release member 94 acts upon the lever end loaded by the spring 93, to release the rack 79 from the beam 60 and bring it back to the rest position by the return of the spring 80, thereby lowering the lifting device 56.

The ends of the beam 60 have wings for supporting the idle position 73 and wings for supporting the operating position 74 respectively. A lead-in funnel 72 is also provided on the beam 60, for receiving the bearing pivot pin 65.

Figure 17:
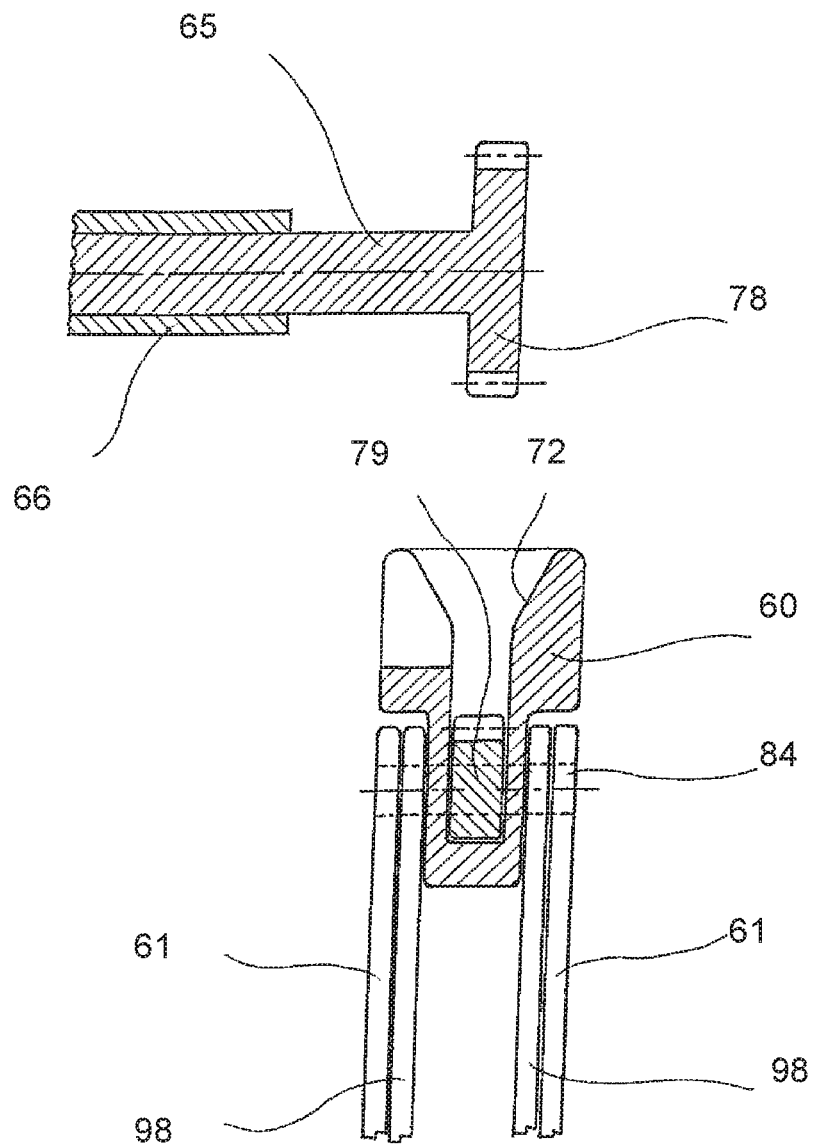
FIG. 17 shows a schematic vertical section of a kinematic rotating arrangement associated with FIG. 16.

FIG. 17 shows a kinematic arrangement for converting the linear motion of the rack 79 to a rotatory motion to the gear wheel 78 that is rigidly joined to the pivot pin 65 (mattress-table, bed or the like) fitting into a receptacle 66 joined to the unit of use 4 via the pin 5, which carries the gear wheel 78 at its end, the latter being adapted to mesh by its teeth with the rack 79 as shown in FIG. 17 with the gear wheel 78 moving toward the rack 79 at the center by the funnel 72 of the beam 60 of the lifting device 56.

Figure 18:
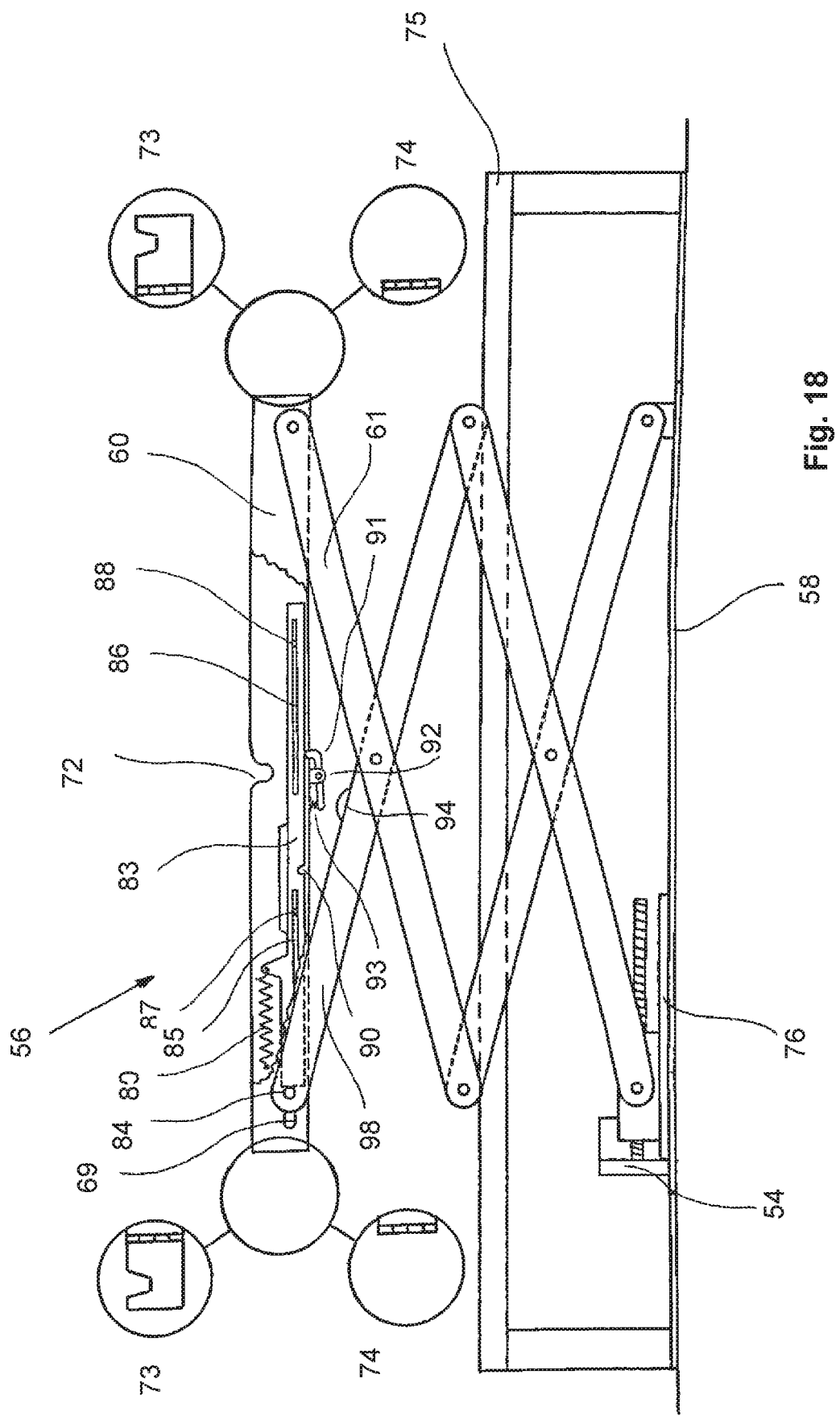
FIG. 18 shows a schematic front view of a lifting mechanism for a multipurpose convertible furniture item in a lifted position, according to a third embodiment.
Figure 19:
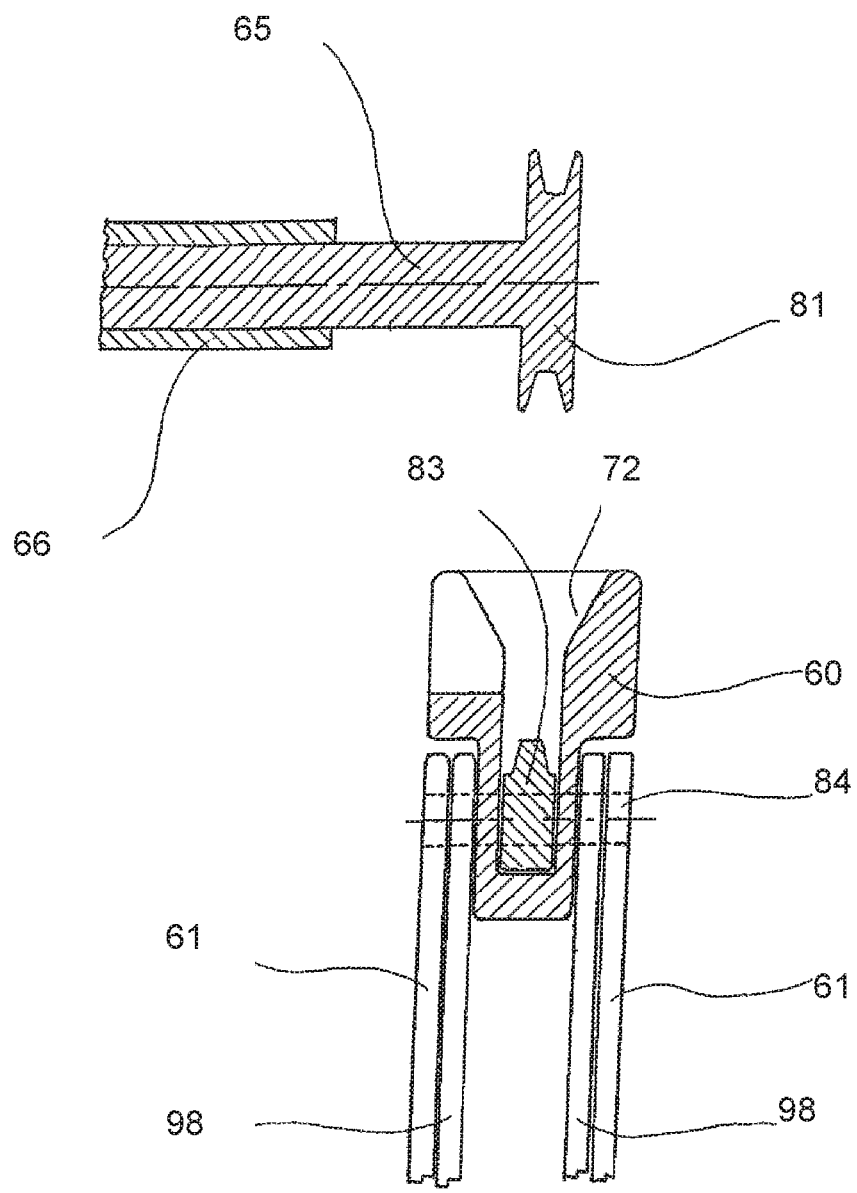
FIG. 19 shows a schematic vertical section of a preferred kinematic rotating arrangement for the mechanism of FIG. 18.
Figure 20:
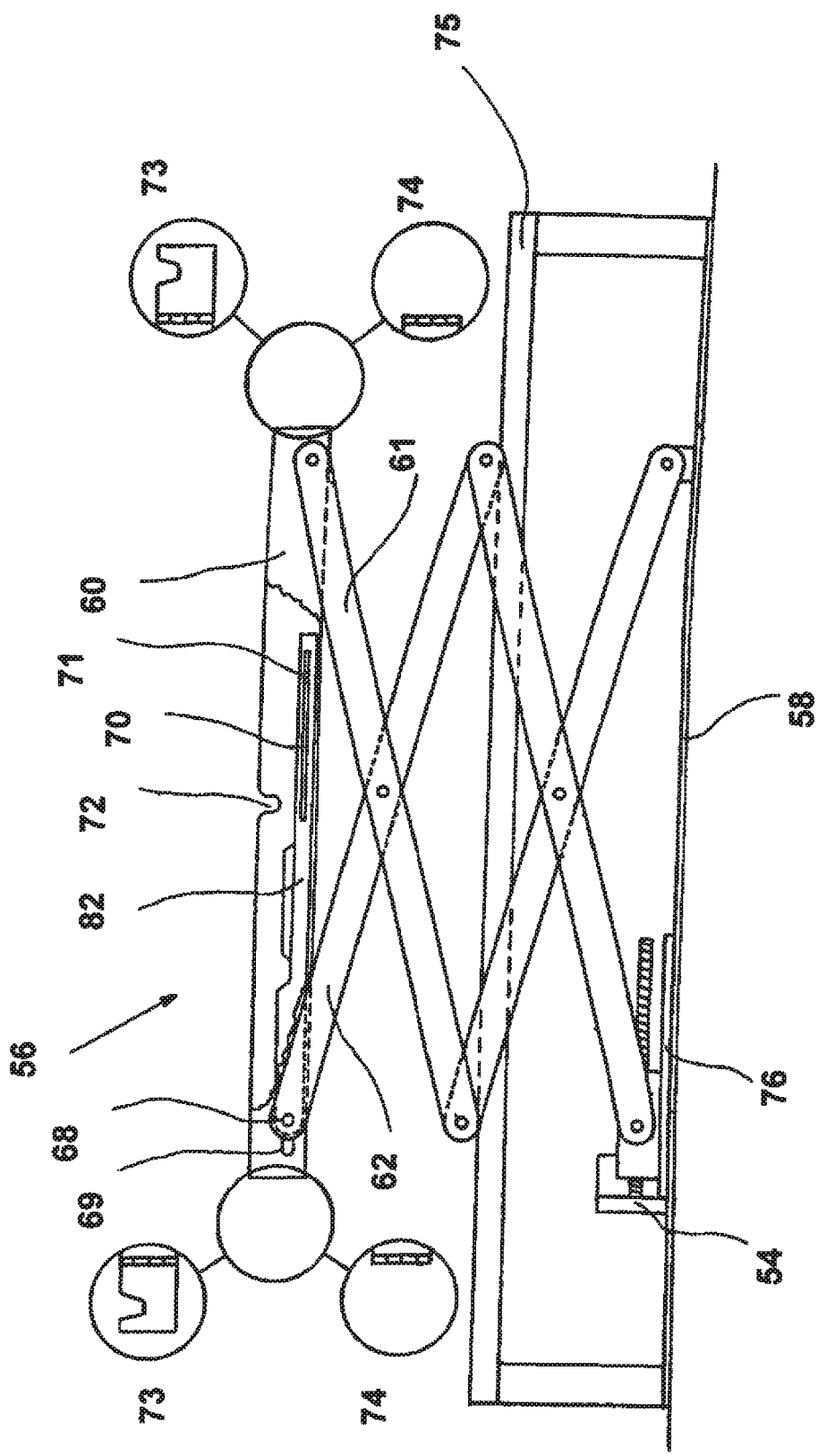
FIG. 20 shows a schematic front view of a lifting mechanism for a multipurpose convertible furniture item in a lifted position, according to a fourth embodiment.
Figure 21:
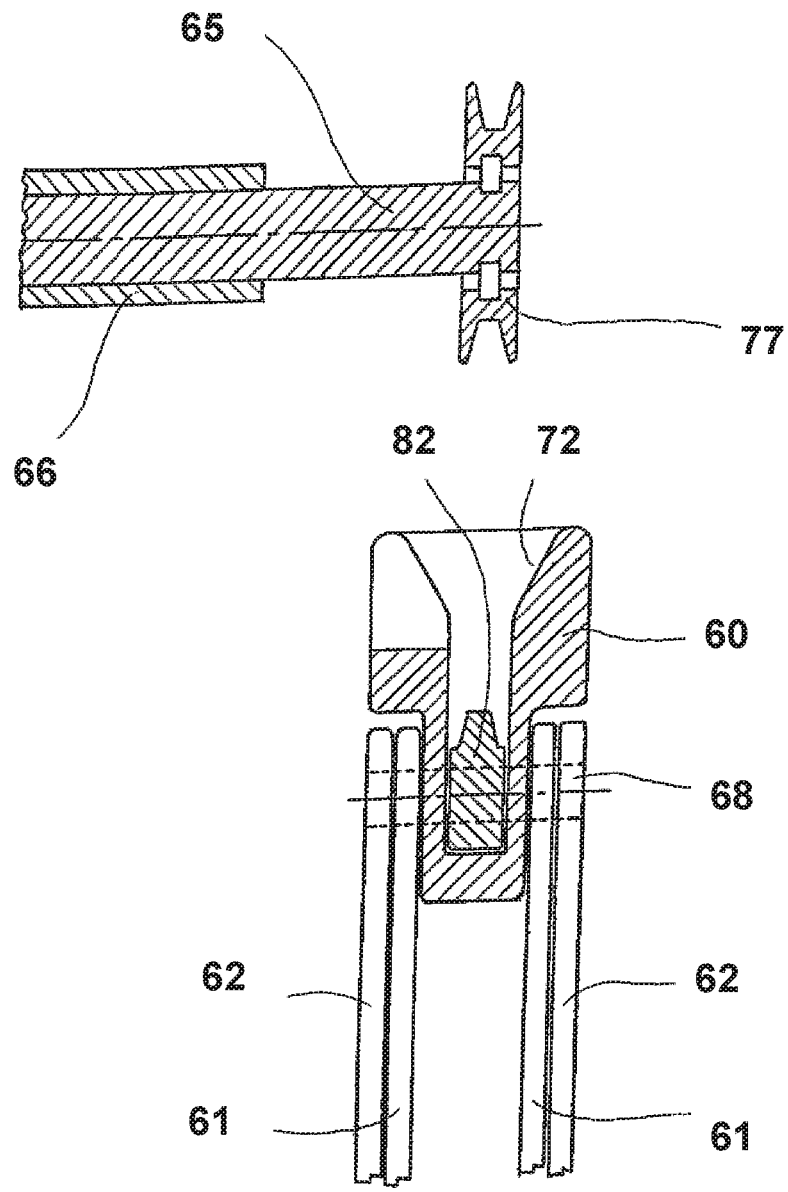
FIG. 21 shows a schematic vertical section of a kinematic rotating, arrangement associated with FIG. 20.
Figure 22:
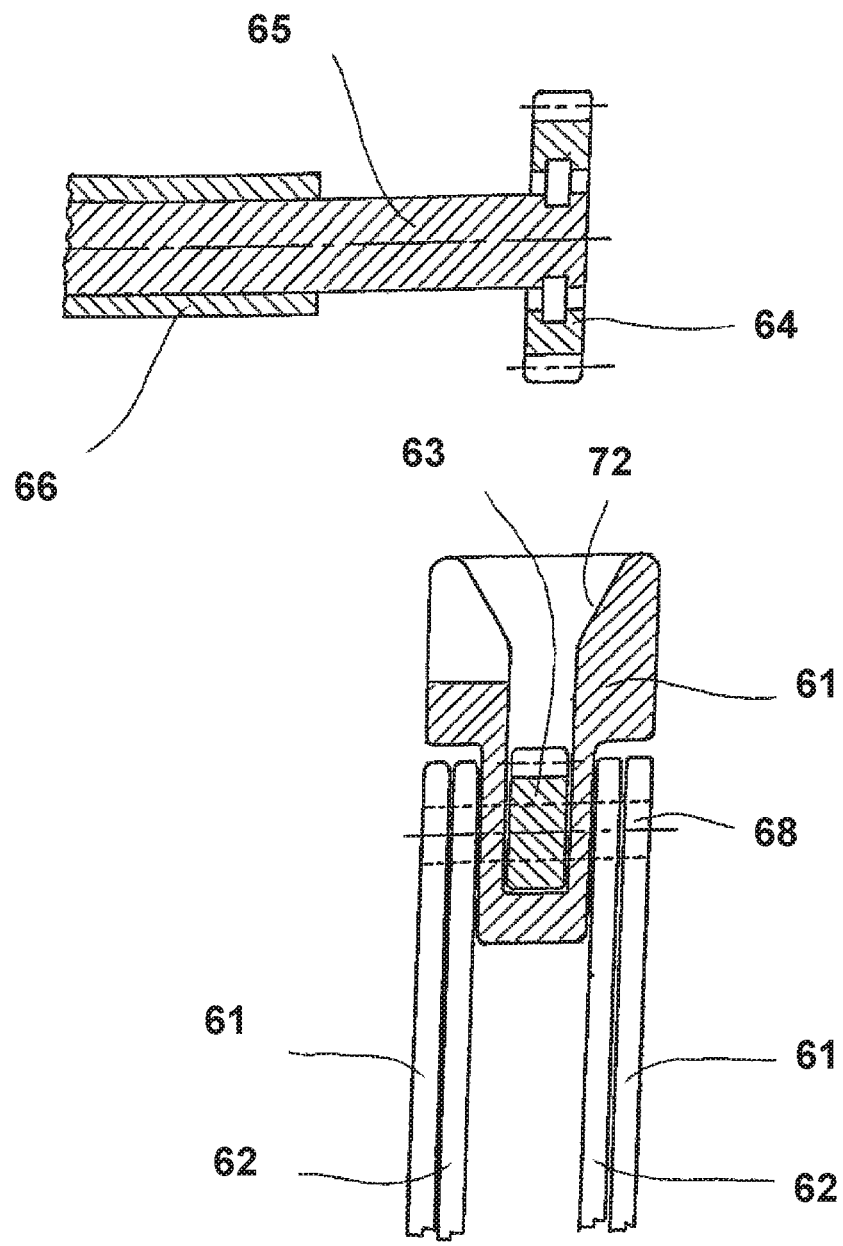
FIG. 22 shows a schematic vertical section of a kinematic arrangement.

FIG. 18 shows an embodiment that differs from the one as described with reference to FIG. 16 in that that the rack is replaced by a bar 83 with slots as 85 and 86 formed therein, sliding on pivots 87 and 88 respectively. The upper surface of the bar 83 is textured or is coated with a unidirectional friction material which is designed to contact a corresponding surface of a friction wheel 81, as shown in FIG. 19.

The operation of the multipurpose convertible furniture item may be summarized as follows In order to lift and rotate the mattress or the mattress with massage table 57, the lifting devices 56 are simply placed parallel to the frame-table-base-support 75, and flush therewith. As the devices are raised and the bearing pivot pin 65 is engaged, and once a suitable height of the mattress or the mattress with the massage table 57 has been reached, the lead-in funnel 72 on the beam 60 rotates through 180° [the suitable height being a height at which the mattress does not contact the frame-base-table-support 75 as it rotates].

At least two lifting devices 56, with no wings 73, 74, on the beam 60, are pieced under the frame-table-base-support 75 to raise such frame-table-base-support 75 or tilt it in either direction; here, they will operate alternately according to the direction of tilt to be obtained.

In order to raise the unit of use 4 and 1 to make the bed, actuation of the opposed lifting devices 56 will cause the upper beams 60 to intercept the frame-base-table-support 75, and lift it to a suitable bed-making height. Once the bed leas been made, the lifting devices 56 will move back down to the rest position, to be ready for a new cycle and remain under the unit of use 4 and 1 of the frame-base-table-support 75.

In order to obtain a tilt in either direction, on or more lifting devices will be lifted in alternate opposite directions depending on the desired tilt.

If at least two opposite lifting devices 56 are placed outside layout of the frame-base-table-support 75 to perform their function, they will be suitably equipped with interception means, i.e. Wings rollers 74, 73, adapted to raise and tilt the frame-table-base-support 75 and move the mattress or the mattress with the massage table 57 to a suitable height for operation. Each lifting device is equipped with at least two wings 73, 74 (as shown in the detail that will be placed on the beam at 90° for their operation in another embodiment, see circle 74, to raise and tilt the unit of use 4, and the multipurpose convertible furniture item 1.

The bearing pivot pins 5 and 65 may be arranged on the horizontal axis, diametrically opposite to each other and also axially in the massage table or mattress with the massage table 57.

In one embodiment at least one bearing pivot pin 5 and 65 projecting out of its receptacle 60 is equipped with a toothed wheel 64 with an idle wheel or a friction disc 77 with an idle wheel.

During the descending and lowering movement, the rack 63 or plate with a rail 82 are moved to the initial position due to the back movement-return of the pin 68. The idle wheel in the gear wheel 64, and the wheel-friction disc 77 are equipped with idle wheels which prevent the return of 63 and 82 and the reverse rotation of the mattress or the mattress with the massage table 57.

The gear wheels 64 with idle wheel the pin 65 or wheel-friction disc 77 projecting out of the mattress insert or mattress with the massage table 57 and at least two in number, such that if the mattress is rotated through 180° about the horizontal axis, the lifting device 56 and the tilt-rotating device, in another embodiment, may ensure the same functions.

In another embodiment, the lifting device 56 has a bearing pivot pin 65 with a gear wheel 78 with no idle wheel.

In another embodiment, the driven elements 78 and 81 designed rotation do not have idle wheels.

The functions of the idle whet are not necessary because, as the lifting device 56 is being lowered, the rack 79 or sliding plate 83 do not move back to the initial rest position.

The rack 33 or sliding plate 82 are guided by the guide slots 70 with a pin 71 and the pin 68 in the groove 69.

One branch 98 of the lifting device 56 has an automatic release member 95 in a suitable position, and as the branches 61 and 98 move apart from each other during the lowering movement to their rest position, the automatic release member 94 contacts the locking pin 91, locks the rack 79 or sliding plate 83 and moves the rack 79 or plate to the initial rest position by means of the spring 80.

The rack 79 or sliding plate 83, which is connected on one side with a spring 80 and on the other side with the beam 60 is pushed by the pin 84 as the lifting device 55 is being raised, and the branches 61 and 98 are being collapsed.

As the branch 98 cooperates with a pin 84 that slides in the groove 69, it pushes the rack 79 or plate 83 until the pivoting lever that pivots about the support 92, with the locking pin 91, engages with the spring 93 in the receptacle 90. When the mattress or the mattress with the massage table 57, once it has rotated through 180° rests during its lowering movement on the frame-base-table-support, the kinematic arrangement connected to the beam 60 of the lifting device 56 is separated from the bearing pivot pin 65, the rack 63 or the sliding plate 82 and 83 move back to their initial position to be ready for a new cycle.

As a result of the displacement of the rack 63 or plate 82 due to the collapse of the branches 61 and 64, the displacement of the pin 68 in the groove 69 of the beam 60 cooperating with the same branch 62 or with the rack 63 or sliding plate 82, once the suitable height for rotation has been reached, causes the rack 63 and the plate 82 to contact the gear wheel 64 or the wheel-friction disc 77 or a wheel having friction material on the part in contact with the plate 82, thereby causing a forward movement of the rack 63 or plate 82 which rotates the mattress or mattress with the massage table 57 through 180°. Once the rotation has been completed, the lifting device 56 is lowered to the rest position and separated from the pin 65 as soon as the mattress or the mattress with the massage table 57 rests on the frame-table-base-support 75.

The invention claimed is:

1. Convertible multifunctional furniture, comprising a bearing base,
at least one lifting device supported on the base,
a unit of use having two outer bearing faces and supported by a frame-base-table-support,
an axis of rotation which is horizontal in the longitudinal or transverse direction, about which the unit of use may be rotated,
a bearing pivot pin at each end of the axis of rotation, which is adapted to be connected with the at least one lifting device, wherein
at least one scissors mechanism placed between the lifting devices and the respective pivot pins,
at least one branch of the scissors connected at one end with an actuator of the lifting device and at the other end with a beam,
the other end of the branch of the scissors being controllingly connected with a linear element having a surface that is adapted to be coupled to a surface of a wheel that is adapted to be rotatably coupled to a complementary element of the bearing pivot pin and the linear element is a meshing toothed element and the wheel is a gear wheel, that is adapted to be rotatably coupled to a complementary element of the bearing pivot pin.

2. The furniture as claimed in claim 1, wherein the toothed element is a rack located within a guiding slot of the beam which connects the two ends of the at least one branch of the scissors for controlling a kinematic arrangement and has at least one of the ends of the at least one branch of the scissors hinged thereto by means of a pin sliding in a groove parallel to the rack, which has a toothed section adapted to engage with the gear wheel starting from a mutual distance between the two ends of the branch, which gear wheel is rotatably placed on the beam in a central position thereof, with its axis transverse to the longitudinal extent of the guiding slot and is adapted to be connected with the pin of the unit of use by means of the kinematic arrangement.

3. The furniture as claimed in claim 2, wherein the kinematic arrangement is composed of a disk keyway on the pin, which is adapted to be coupled with a key of a disk that is rotatably supported by the beam with its axis joined to the axis of the gear wheel with an idle wheel meshing with a rack.

4. The furniture item as claimed in claim 2, wherein the kinematic arrangement is composed of a pinion rigidly joined to the pin, adapted to be coupled with the gear wheel that is rotatably supported by the beam with its axis joined to the axis of the gear wheel, which has an idle wheel, and the idle wheel meshes with the rack.

5. The furniture as claimed in claim 2, wherein the kinematic arrangement is composed of a bar linkage with bars hinged to one of the ends controlling said bars and converging into one joint, and of a toothed circular sector rigidly joined to one of the ends of the bar and meshing with a pinion on a shaft rotatably carried by a flange having an extension with a bisecting line in which a joint of one of the ends of two arms slides, the other ends being hinged to the respective bars at a distance from their joint, the pinion transferring motion, through multiplying gears, to a second pinion with an idle wheel adapted to engage with a gear carried by the pin of the unit of use.

6. The furniture as claimed in claim 1, wherein the at least one lifting device, a bearing base which is integral with an actuator, which operates in a known manner by means of a slider that slides along a linear guide, the lifting device being hinged via branches to the free end of the beam, whereas the free end of a branch is hinged around a pin that slides in a groove formed in the beam to push a rack toward the free end of the branch as the lifting device is being raised, the rack has at least one groove, with pins or blocks engaging in slots to ensure displacement of the horizontal rack.

7. The furniture as claimed in claim 1, wherein a kinematic arrangement for converting the linear motion of a rack to a rotary motion is obtained by forming a receptacle in the bearing member for receiving the bearing pivot pin joined to a bearing member, which carries at its free end the gear wheel, which is adapted to mesh by its teeth with the rack with the gear wheel moving toward the rack at the center on a lead-in funnel of the beam of the lifting device.

8. The furniture as claimed in claim 1, wherein the linear element is a bar with slots, sliding on pivots, the upper surface of the bar being textured or coated with a friction material designed to contact a corresponding surface of a friction wheel.

9. The furniture as claimed in claim 1, wherein the unit of use is placed on a base consisting of two frameworks that can be fitted into and pulled out of each other, from a seating position to a lying position and vice versa, and is formed by a table composed of three mutually articulated sections, one articulated section cooperates with part of a second section of a mattress, is connected with a second articulated section via a first toggle joint lever, cooperating with part of the second section of the mattress, one end of a first lever whereof being articulated to the first articulated section and the end of a second lever being articulated to the second articulated section, whose other end is articulated to the third articulated section via a second toggle joint lever whose ends are hinged to the second and third articulated sections, cooperating with a first section and the second section of the mattress.

10. The furniture as claimed in claim 1, wherein the unit of use has a guide cooperating with a third section of a massage table which is adapted to cause a second section of a mattress to slide into a state for conversion from an armchair to a bed and from a bed to an armchair and from a massage table to a chair.

11. The furniture as claimed in claim 1, wherein clamps of the unit of use serve as a lock against back conversion from a bed table to an armchair and from a message table to a chair.

12. The furniture item as claimed in claim 1, wherein sliding locking/unlocking members inserted in a lever pin, lock the unit of use as the latter is raised and rotated through 180°, thereby preventing a mattress with massage table from collapsing.

13. The furniture as claimed in claim 1, wherein the at least one lifting, devices are at least two in number and may be used for conversion from seating to raising and tilting sofas and high chairs for children.

14. The furniture as claimed in claim 1, wherein a pull-out lifting device is provided for conversion of a horizontal surface composed of coupled elements in a tilted plane.

15. The furniture as claimed in claim 1, wherein a spring returns a rack and a sliding plate has a return spring therefor.

16. The furniture as claimed in claim 1, wherein a spring holds a pivoting lever with a locking pin.

* * * * *